May 27, 1958  J. M. ARROWSMITH ET AL  2,835,989
DEVICE FOR CORRECTING QUIZ PAPERS AND
WORK BOOKS IN SCHOOL CLASSROOMS
Filed July 27, 1956   2 Sheets-Sheet 1
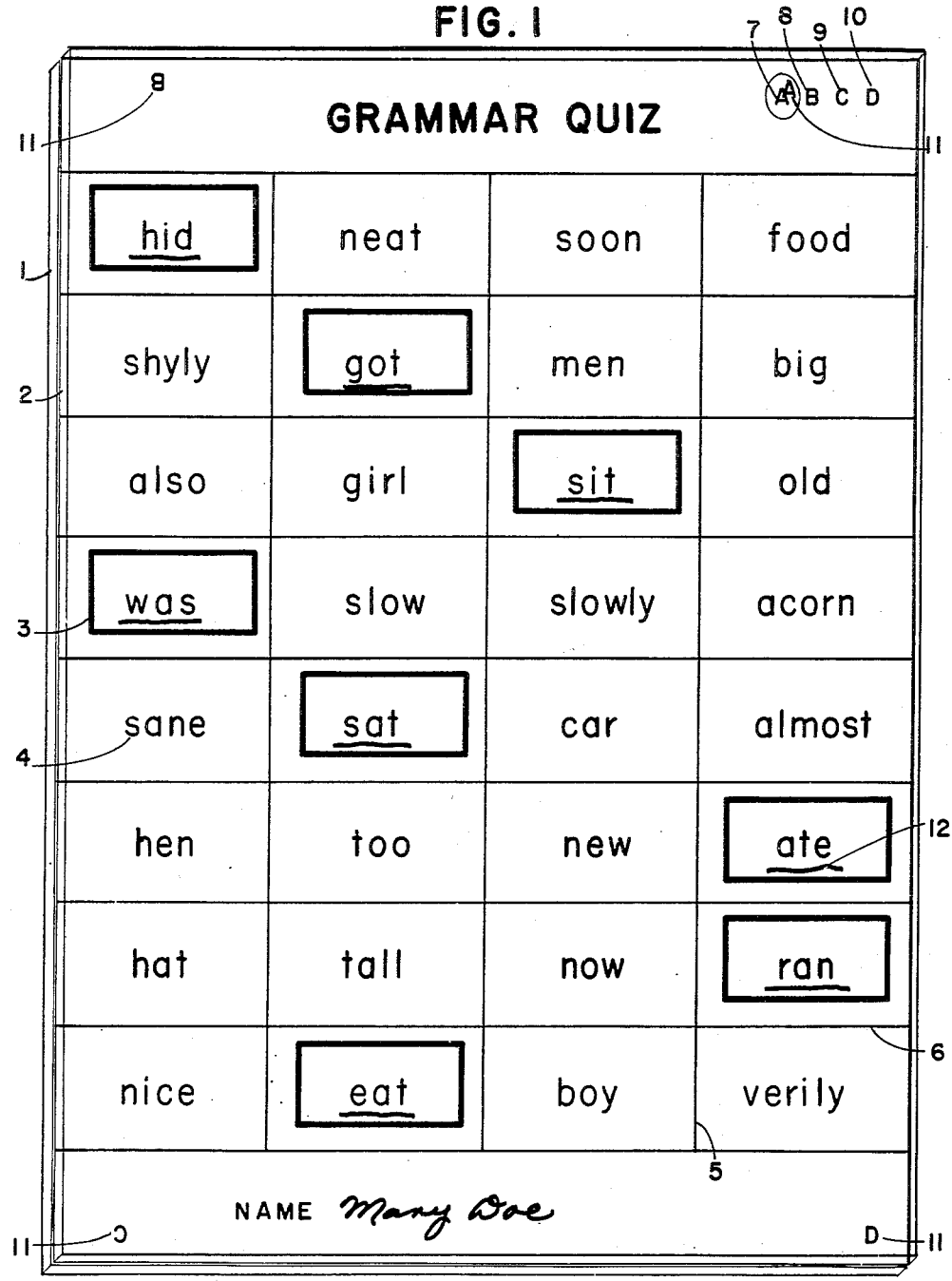
INVENTORS
Jessie M. Arrowsmith
Robert H. Arrowsmith

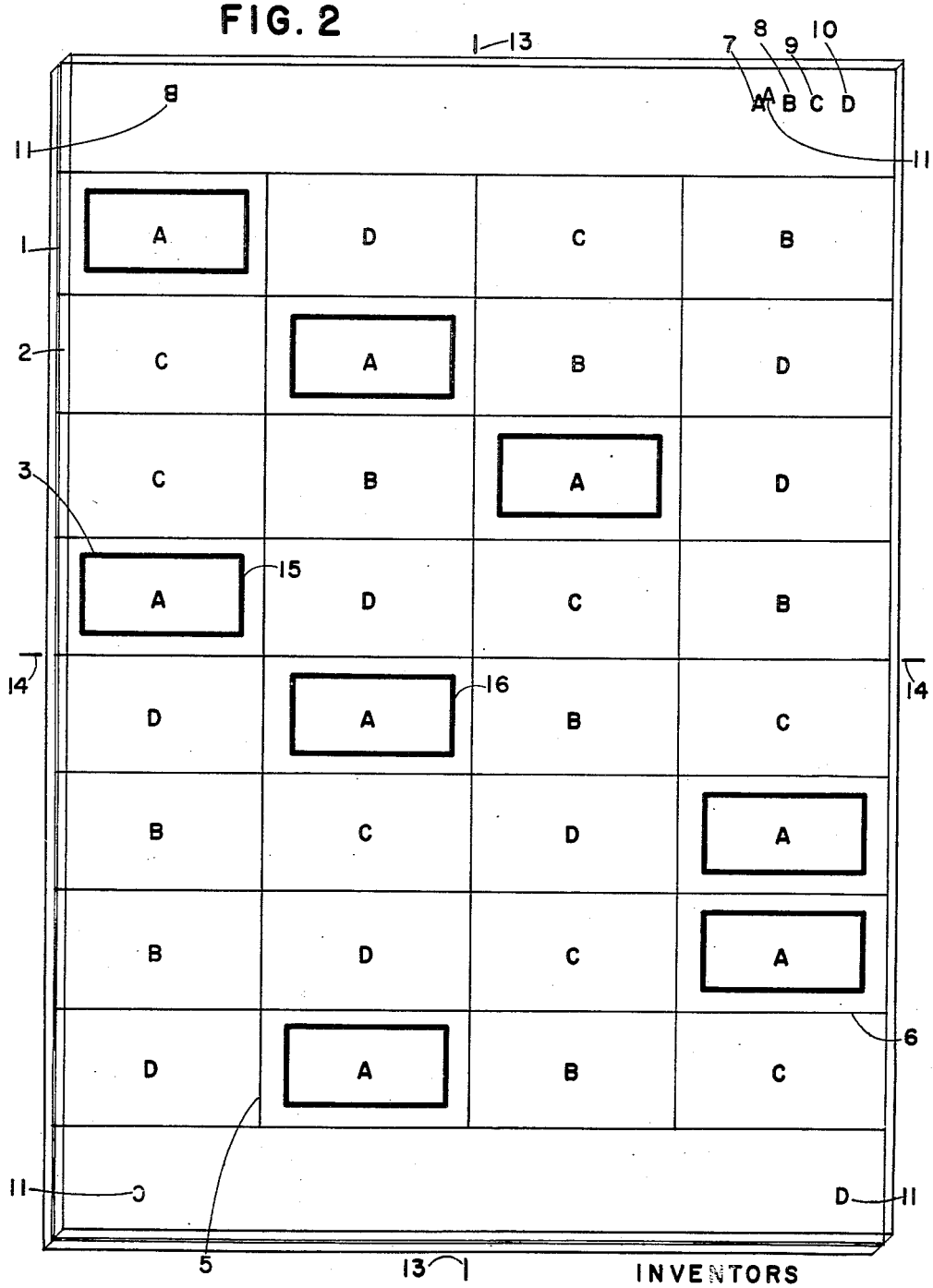

United States Patent Office 2,835,989
Patented May 27, 1958

2,835,989

DEVICE FOR CORRECTING QUIZ PAPERS AND WORK BOOKS IN SCHOOL CLASSROOMS

Jessie M. Arrowsmith and Robert K. Arrowsmith, Sherwood, Oreg.

Application July 27, 1956, Serial No. 600,549

2 Claims. (Cl. 35—48)

Our invention relates to a device or means for correcting and grading quizzes or work books in school classrooms. This invention includes and employs especially prepared quizzes and work books with an accompanying corrector device for grading said papers. Our process for correcting and grading quizzes and work books in the schoolroom greatly simplifies and alleviates the work of the teacher when presenting tests of the multiple choice type. The person grading papers with our device does not need to know the correct answers to the quiz; thus making it possible for persons other than the teacher to grade quiz papers. Eye strain being greatly reduced the chances of making errors in grading papers with our device is lessened. The person correcting papers of a multiple choice quiz places the corrector device over the quiz paper, and the answer areas are readily apparent to the observer with a minimum of time spent in scanning. Children in the first grade can readily correct quiz papers especially prepared for their grade level with our device, and granting the privilege of self evaluation provides an incentive for the children to do better work. Since the employment of the multiple choice test has become standard classroom practice, our process for preparation and grading of this type of test has distinct advantages in obtaining objectiveness in the test and in time saving possibilities.

In the drawings:

Figure 1 is a perspective view of an embodiment of our invention showing a quiz paper with corrector device upon same.

Figure 2 is a perspective view of an embodiment of our invention showing a paper simulating the same quiz paper as in Figure 1 with indicia of identifying letters instead of indicia of stimulus words thereupon, and with a corrector device in place upon said paper.

As show nin Figure 1:

Part 1 is a quiz paper especially prepared for use with the corrector device. Part 2 is a corrector device made of stiff, clear, plastic sheeting or other material. Indicia 3 are printed rectangles upon the corrector device. Indicia 4 are stimulus words printed upon the quiz paper. Lines 5 are vertical lines printed upon the quiz paper. Lines 6 are horizontal lines printed upon the quiz paper. Indicia A 7, B 8, C 9, and D 10 are letters printed upon the quiz paper designed to be circled by the child at the direction of the teacher to indicate which position of the corrector device is to apply to the quiz. Indicia 11 are letters printed near the corners of the corrector device to be placed in correspondence with letters on the quiz paper to indicate which position of the corrector device applies to any particular designated quiz. Mark 12 is the underline made by the child in response to the stimulus word or question.

Figure 1 depicts an embodiment of our invention in the form of a multiple choice quiz paper with the corrector device in outline register upon the quiz paper. This form may be considered an article of manufacture: the quiz papers being supplied loosely or in pads and adaptable for use only with the corrector device shown. A large number of quiz papers on language, history, etc., could be printed and adapted to the particular corrector device shown in the drawing, but a corrector device with another arrangement of the printed rectangles could not be used with the quiz paper shown on the drawing. The corrector device shown on the drawing is indexed in all four corners with the letters A, B, C, and D. It presently depicts the corrector device as being in position A, with the printed rectangles of the corrector device outlining all of the verbs on the quiz paper, including the underlining marks of the student, and the student is shown to have marked the quiz properly for the verb test. To fully utilize the quiz the testing procedure would be continued with a fresh copy of the same quiz paper at another class period for an adverb quiz, the paper graded by placing the corrector device upon the quiz paper with index letter B of the corrector device corresponding to the index letter B on the quiz paper; and so forth with a fresh copy using the index C for nouns, and another fresh copy at another class period using the index D for adjectives. While the foregoing indicates a manifold use of one multiple choice quiz paper by issuing the students a fresh copy of the same quiz at different class periods, another use may be made of the same corrector device whereby four new quiz forms are prepared, each form using a different position of the corrector device. This last procedure would be used when the subject has been mastered to the extent that the student could find the correct answer by elimination of the known.

Referring to Figure 2:

Part 1 is a quiz paper simulating that shown in Figure 1 and prepared for use with our device. Part 2, is a corrector device made of stiff, clear, plastic sheeting or other material. Indicia 3 are printed rectangles upon the face of the corrector device, of which there are eight in this drawing. Lines 5 are vertical lines printed upon the quiz paper. Lines 6 are horizontal lines printed upon the quiz paper. The letters A 7, B 8, C 9, and D 10 are printed upon the quiz paper in the upper right hand corner and when circled indicate which position of the corrector device is to apply to the quiz. Letters A, B, C, and D numbered 11 on the four corners of the corrector device, indicate which position of the corrector device corresponds to a particular quiz. Marks 13—13 indicate the position of the vertical axis of the corrector device. Marks 14—14 indicate the position of the horizontal axis. Letters A, B, C and D within the rectangles are not printed upon the quiz paper or the corrector device, but are shown for the purpose of explanation on Figure 2. Indicia A indicates the arrangement of the printed rectangles of the corrector device when placed in position A on the quiz paper. Indicia B indicates the arrangement of the printed rectangles of the corrector device when placed in position B on the quiz paper. Indicia C indicates the arrangement of the printed rectangles of the corrector device when placed in position C on the quiz paper. Indicia D indicates the arrangement of the printed rectangles of the corrector device when placed in position D on the quiz paper.

Considering the corrector device depicted in Figure 2 as being hypothetically divided like the quiz paper; namely, four vertical columns of which two would be considered interior and two exterior; and further divided into horizontal rows of four rectangular spaces each, then our process for arrangement of the printed rectangles upon the face of the corrector device can be stated by stipulations, whereby: only one rectangle can be printed on any horizontal row of four rectangular spaces, and if a rectangle is printed on a rectangular space of an interior column a predetermined number of horizontal rows above the central horizontal axis, then, in order that no interference could take place when the corrector device is manipulated through its four useful positions, the printed rectangle for the symmetrically corresponding row below the central horizontal axis must necessarily be placed in an exterior column; conversely, if a rectangle is printed on a rectangular space of an exterior column another predetermined number of horizontal rows above the central horizontal axis, then the printed rectangle for the symmetrically corresponding row below the central horizontal axis must necessarily be placed on a rectangular space of an interior column.

The two printed rectangles A 15 and A 16 on the corrector device would not have repeated in register any rectangular space of the quiz paper adjacent to the horizontal axis in progressing through the four positions A 7, B 8, C 9, and D 10; furthermore any two printed rectangles within the same two rows symmetrically related to the horizontal axis may form a couple in other combinations; so long as only one printed rectangle was assigned to each horizontal row, and providing one printed rectangle was exterior to the other. The two rectangles A 15 and A 16 adjacent to the horizontal axis 14—14 may be considered as forming a couple and acting together register with all eight rectangular spaces adjacent to said horizontal axis when the corrector device is manipulated through the four useful positions A 7, B 8, C 9, and D 10. These two printed rectangles A 15 and A 16 in position A 7 progress to position B 8 by raising and rotating the corrector device one hundred eighty degrees about its vertical axis, and again placing it in outline register with the quiz paper. These two printed rectangles in position B 8 progress to position C 9 by raising and rotating the corrector device one hundred eighty degrees about the horizontal axis and again placing it in outline register with the quiz paper. These two printed rectangles in position C 9 progress to position D 10 by raising and rotating the corrector device one hundred eighty degrees about its vertical axis and again placing it in outline register with the quiz paper.

Manifestly our process of correcting and grading quizzes and tests is subject to embodiment in various other forms than those described above, which are to be regarded as exemplary rather than restrictive of the process, without departing from the spirit of the process as described by the following claims.

We claim:

1. A corrector device for correcting quiz papers, or similar papers bound into work books, a quiz paper faced with multiple-choice response indicia within printed rectangular spaces symmetrically disposed about the central horizontal and vertical axes of said paper, there being a plurality of horizontal rows of said rectangular spaces divided by vertical ruling into four columns, two on each side of the central vertical axis, and as many rows of four rectangular spaces below the central horizontal axis as above said axis; in combination, a corrector device comprised of a sheet of stiff, transparent plastic, or other material, substantially identical in outline to the quiz paper, its complement, said corrector device being unbound and capable of being placed in outline register with the quiz paper, and where said corrector device bears printed rectangles registering with one-fourth of the rectangular spaces upon the quiz paper and encompassing the response indicia thereupon together with the student's markings adjacent to said response indicia; and where said corrector device may be raised from close contact with the quiz paper, rotated one hundred eighty degrees about its vertical axis and again placed in outline register with the quiz paper, the aforesaid printed rectangles of the corrector device registering with another group of rectangular spaces upon the quiz paper together with another group of response indicia, this second group of quiz paper rectangular spaces being entirely different from those mentioned in the first position of the corrector device; and where said corrector device may be raised from closed contact with the quiz paper, rotated one hundred eighty degrees about its central horizontal axis and again placed in outline register with the quiz paper, the aforesaid printed rectangles of the corrector device registering with another group of rectangular spaces upon the quiz paper, this third group of quiz paper rectangular spaces being entirely different from those mentioned in the first and second positions of the corrector device; and where said corrector device may be raised from close contact with the quiz paper, rotated one hundred eighty degrees about its central vertical axis and again placed in outline register with the quiz paper, the aforesaid printed rectangles of the corrector device registering with another group of rectangular spaces upon the quiz paper, this fourth group of quiz paper rectangular spaces being entirely different from those mentioned in the first, second, and third positions of the corrector device; whereby the foregoing acts of manipulating the corrector device through the four useful positions upon the quiz paper, its complement, has caused the set of printed rectangles of the corrector device to have been placed in register with all of the rectangular spaces bearing the response indicia, and the student's markings adjacent to same, upon said quiz paper without repetition or omission.

2. A corrector device for correcting quiz papers, or similar papers bound into work books, as described in claim 1; quiz papers especially prepared for use with the process previously described; in combination, a corrector device composed of opaque sheeting material pierced with rectangular or other shaped apertures symmetrically disposed about the central vertical and horizontal axes in accordance with the process previously described; whereby said opaque, aperture-bearing corrector device would be capable of performing all the operations ascribed to the transparent corrector device previously described.

No references cited.